No. 12,840. REISSUED AUG. 4, 1908.

C. VALLONE.

BED BOTTOM.

APPLICATION FILED APR. 7, 1905.

Witnesses:-
R. W. Kinnear
E. A. Volk.

Inventor:
Charles Vallone,
Wilkins, Parker & Hard
Attorneys.

UNITED STATES PATENT OFFICE.

CHARLES VALLONE, OF BUFFALO, NEW YORK, ASSIGNOR, BY MESNE ASSIGNMENTS, TO BARCALO MANFG. CO., OF BUFFALO, NEW YORK.

BED-BOTTOM.

No. 12,840. Specification of Reissued Letters Patent. Reissued Aug. 4, 1908.

Original No. 733,772, dated July 14, 1903, Serial No. 151,255. Application for reissue filed April 7, 1905. Serial No. 254,408.

*To all whom it may concern:*

Be it known that I, CHARLES VALLONE, a citizen of the United States, residing in Buffalo, in the county of Erie and State of New York, have invented new and useful Improvements in Bed-Bottoms, of which the following is a specification.

This invention relates to bed-bottoms, and more particularly to the well-known woven-wire bed-springs or mattresses. The woven-wire fabric of these bottoms usually consists of longitudinally-arranged interlocked or interwoven wire coils or strands, and the resilience of the bottom is due to the elasticity of these interlocked coils. When the woven-wire mattress is required to sustain a heavy weight on a restricted portion of its surface for a considerable time or repeatedly—as, for instance, when a heavy person occupies the central portion of the mattress—the longitudinally-arranged wire coils or strands constituting the bottom become permanently stretched or set in that locality, so that the bottom sags or is distorted to such an extent as to materially lessen its resilience and comfort as well as detract from its neat appearance and desirability. Furthermore, when a weight is on the bottom, especially when a person sits or reclines on the side of the bed, the side edges of the wire mattress are drawn inward and depressed below the side rails of the supporting-frame, which is a serious objection.

The object of the invention is to provide a bed-bottom with simple, light, and inexpensive means which will permanently preserve the original form and elasticity of the bottom and enable it to sustain a great weight without deterioration, and this without sacrificing in any degree the resilience and ease of the bottom for a person of light weight.

Figure 1:
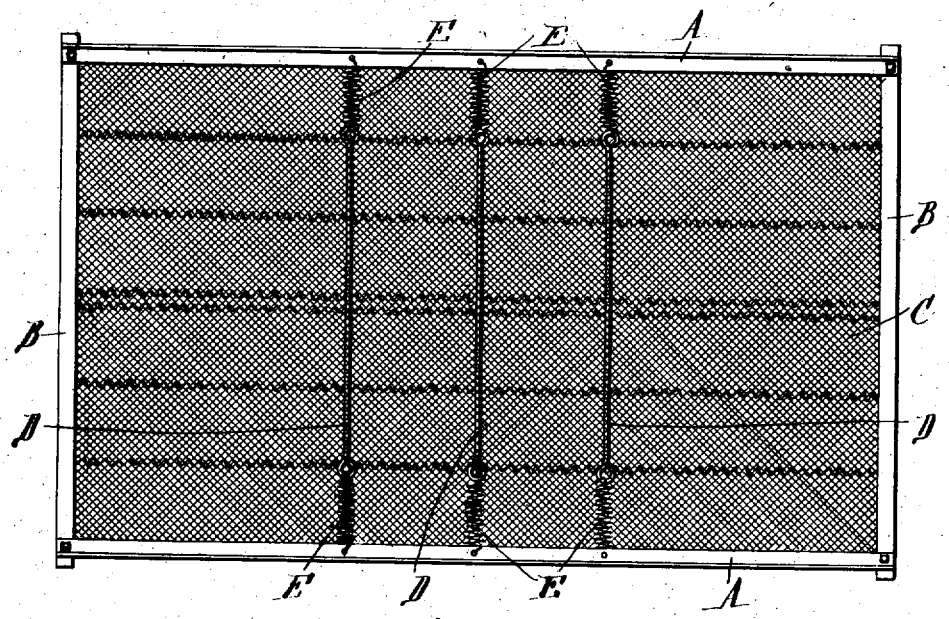
Figure 3:
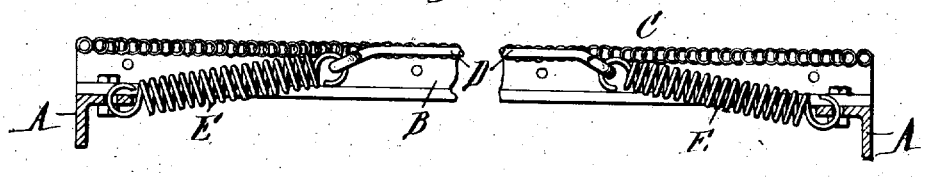
Figure 2:
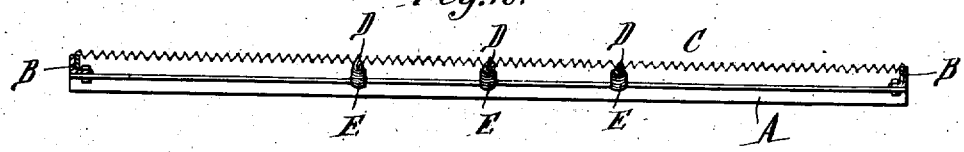

In the accompanying drawings, Figure 1 is a bottom plan view of a woven-wire bed-bottom embodying the invention. Fig. 2 is a longitudinal section thereof. Fig. 3 is a transverse section thereof on an enlarged scale.

Like letters of reference refer to like parts in the several figures.

A represents the longitudinal side rails, and B the end rails, of the usual rectangular supporting-frame for the woven-wire mattress, which is shown at C, and, as usual, consists of longitudinally-arranged interwoven or interlocked wire coils or strands. The opposite ends of the woven-wire fabric are secured in any usual or suitable manner to the end rails of the frame, which latter are preferably arranged on top of or extend up above the side rails, so that the fabric which connects the upper edges of the end rails occupies a horizontal plane some distance above the top faces of the side rails. The frame shown is made of flanged metal bars; but a frame of any other suitable construction may be employed.

D represents flexible supporting and stay wires, strips, cables, or the like which are arranged transversely across the wire fabric and are connected to the latter at frequent intervals in some convenient manner, preferably by threading or passing the wires through the coils or strands of the fabric for practically their entire length and nearly the entire width of the fabric. The drawings show three wires D, arranged parallel at the central portion of the bed-bottom, which is at present deemed the most suitable number and arrangement for general satisfaction; but a greater or less number of wires may be employed. The opposite ends of the transverse stay-wires are connected to the side rails of the supporting-frame by coil springs E. The coil-springs are attached at their inner ends to the stay-wires and at their outer ends to the side rails in any suitable manner. For instance, the springs are provided at their ends with hooks, which engage in eyes at the ends of the stay-wires and holes in the side rails of the frame. As the woven-wire fabric when not strained occupies a horizontal plane above the tops of the side rails, as above explained, and as the stay-wires are secured to the woven-wire fabric and to the springs, the latter incline upwardly from the points of attachment of their outer ends with the side rails to the ends of the stay-wires. The stay-wires are made somewhat shorter than the horizontal distance between the inner ends of the coil-springs when in their normal inclined position, (shown in Fig. 3), so that the springs are normally strained or stretched somewhat when in this inclined position. When weight is placed upon the bed-bottom and the latter is depressed, the inner ends of the springs swing downwardly with the woven-wire fabric and the stay-wires and contract slightly until they reach a horizontal line connecting the outer ends of the springs, and they are not again strained until the springs pass this horizontal line. Consequently they do not in any wise oppose the free yielding of the woven-wire fabric under a light weight. The bed-bottom is therefore just as easy and comfortable for a light person as if no supports or stay-wires were employed. When, however, the bed-bottom is depressed considerably by a heavy person or persons, the coil-springs connected to the stay-wires are brought into play and strained or placed under tension and relieve the woven-wire fabric from undue strain, so that its elasticity is not impaired. When the weight is removed from the bed-bottom, the coil-springs and elasticity of the woven-wire fabric mutually assist in returning the latter and stay-wires to their normal position. The stay-wires being intimately connected to or threaded through the coils or strands of the woven-wire fabric equalize or distribute the load, which may bear on a restricted part only of the fabric, throughout the width of the same, thereby preventing the coils or strands immediately beneath the load from carrying the entire weight and becoming abnormally stretched or distorted. As the ends of the stay-wires are connected to the coil-springs, which are beneath the woven-wire fabric, the side edge portions of the fabric can only be drawn laterally inward for an almost imperceptible distance, and as the springs are attached to the side rails of the frame the side edges of the fabric cannot be depressed below the side rails.

The stays or supports described form an especially desirable adjunct to woven-wire bed-bottoms, but the usefulness of the stay springs arranged so that they do not oppose a slight or initial depression of the bottom but supplement the bottom and aid in supporting the load when the bottom is further depressed, and so as to equalize or distribute the load throughout the bottom, is not restricted to use with the woven-wire fabric nor to the particular means described for attaching the springs to the fabric.

Supplemental transverse supports for woven-wire bed-bottoms have heretofore been provided which were arranged beneath the woven-wire fabric and yieldingly connected to the side rails of the supporting frame. These supports, however, are not connected to the woven-wire fabric and act in no wise to equalize the strains on the fabric. They are also objectionable, for the reason that when the fabric is depressed into contact with the support a grating or harsh sound is produced, which is very objectionable. It has also been proposed to pass a transverse rod or rods through the fabric and connect the ends of the same to the side edges of the fabric, but not to the side rails of the supporting-frame. In such a construction if the rods are light and flexible they must give with that portion of the fabric which is stretched by the weight on the same, and as they are not connected by springs to the side rails the woven-wire fabric alone is relied upon to straighten the rods, and consequently the rods must have little or no effect in retaining the original form and condition of the fabric when subjected to heavy weights. If the rods are stiff enough to prevent them giving freely with the fabric, they render the bed-bottom extremely uncomfortable. These rods cannot in any wise prevent the side edges of the fabric from being drawn inward and depressed below the side rails, for they must yield and bend with the fabric. It has been further suggested to provide reinforcing-wires threaded through the fabric lengthwise and connected by springs to the end rails of the frame. Wires connected to the same ends of the frame as the fabric and running longitudinally through the coils cannot equalize unequal strains on the strands of the fabric. The wires are free to spread laterally and have no tendency to prevent the distortion and stretching of the coils of fabric between the wires or to prevent the side edges of the fabric from being drawn inwardly and depressed below the side rails.

I claim as my invention:

1. The combination with a frame, and a flexible bottom fabric supported at its opposite ends by said frame and forming an elastic supporting surface, of supplemental stay-springs which are attached to the side portions of said frame and have connections with said bottom fabric which equalize the strains on different portions thereof, said springs being normally strained and inclining upwardly towards said fabric so that they are relaxed by an initial depression of the bottom and are again strained by a further depression of the bottom, substantially as set forth.

2. The combination with a frame, and a woven-wire fabric attached at its ends to the ends of said frame and arranged in a plane above the sides of said frame, of a flexible extensible stay arranged transversely across and connected at its ends to the sides of said frame and having a substantially straight smooth portion arranged substantially in the plane of and connected to said fabric, substantially as set forth.

3. The combination with a frame and a woven-wire fabric attached at its ends to the ends of said frame, of a straight stay-strip arranged transversely across said fabric substantially in the plane of and connected to said fabric, and springs connecting the opposite ends of said stay-strip to the sides of said frame, substantially as set forth.

4. The combination with a frame, and a flexible bottom attached at its ends to said frame and arranged in a plane above the sides of said frame, of a stay arranged transversely across and connected to said flexible bottom, and springs which incline upwardly from the sides of said frame and are connected to the latter and to the opposite ends of said stay, substantially as set forth.

5. The combination with a frame, and a woven-wire fabric attached at its ends to the ends of said frame, of a stay-wire extending transversely through said woven-wire fabric, and coil-springs which are connected at their outer ends to the sides of said frame and incline upwardly and are connected at their inner ends to the opposite ends of said stay-wire, substantially as set forth.

Witness my hand this 31st day of March, 1905.

CHARLES VALLONE.

Witnesses:

C. W. PARKER,

EDWARD C. HARD.